United States Patent
Vasconcelos et al.

(10) Patent No.: US 10,718,657 B2
(45) Date of Patent: Jul. 21, 2020

(54) WEIGHING BAR ASSEMBLY

(71) Applicant: Robert Bosch Limitada, Campinas (BR)

(72) Inventors: Alvaro Augusto Vasconcelos, Campinas (BR); Luiz Fernando L. Ribeiro, Jr., Campinas (BR)

(73) Assignee: ROBERT BOSCH LIMITADA, Campinas-Sp (BR)

( * ) Notice: Subject to any disclaimer, the term of this patent is extended or adjusted under 35 U.S.C. 154(b) by 40 days.

(21) Appl. No.: 16/062,948

(22) PCT Filed: Dec. 13, 2016

(86) PCT No.: PCT/BR2016/050323
§ 371 (c)(1),
(2) Date: Jun. 15, 2018

(87) PCT Pub. No.: WO2017/100890
PCT Pub. Date: Jun. 22, 2017

(65) Prior Publication Data
US 2018/0364093 A1 Dec. 20, 2018

(30) Foreign Application Priority Data
Dec. 16, 2015 (BR) .............................. 102015031525

(51) Int. Cl.
*G01G 21/23* (2006.01)
*G01G 21/28* (2006.01)
*G01G 23/06* (2006.01)

(52) U.S. Cl.
CPC ............. *G01G 21/23* (2013.01); *G01G 21/28* (2013.01); *G01G 23/06* (2013.01)

(58) Field of Classification Search
CPC .......... G01G 21/23; G01G 21/28; G01G 23/06
USPC ........................................................... 177/126
See application file for complete search history.

(56) References Cited

U.S. PATENT DOCUMENTS

| 4,023,633 | A | * | 5/1977 | Swersey | G01G 1/24 |
| | | | | | 177/144 |
| 4,258,810 | A | * | 3/1981 | Susor | G01G 3/12 |
| | | | | | 177/128 |
| 4,346,771 | A | * | 8/1982 | Persson | G01G 3/12 |
| | | | | | 177/145 |
| 4,453,607 | A | | 6/1984 | Zink | |
| 4,482,783 | A | * | 11/1984 | Laimins | A61G 7/0527 |
| | | | | | 177/147 |

(Continued)

FOREIGN PATENT DOCUMENTS

EP 0361518 A2 4/1990

OTHER PUBLICATIONS

Computer translation of EP 0361518 downloaded Mar. 16, 2020.*
International Search Report and Written Opinion of PCT/BR2016/050323, dated Mar. 1, 2017 (9 pages).

*Primary Examiner* — Randy W Gibson
(74) *Attorney, Agent, or Firm* — Michael Best & Friedrich LLP

(57) ABSTRACT

A weighing bar assembly includes a hollow structural part (1), with two load cells (2) positioned therein. The assembly further includes two ground support shoes (4). Each of the load cells (2) is attached at one end to the structural part (1) by a securing block (3) and at its other end to a corresponding ground support shoe (4).

8 Claims, 2 Drawing Sheets

(56) References Cited

U.S. PATENT DOCUMENTS

| | | | | |
|---|---|---|---|---|
| 4,551,882 | A * | 11/1985 | Swersey | G01G 19/445 16/226 |
| 4,899,840 | A * | 2/1990 | Boubille | G01G 19/083 177/139 |
| 5,859,390 | A * | 1/1999 | Stafford | G01G 19/445 177/144 |
| 5,895,894 | A * | 4/1999 | Zumbach | G01G 21/30 177/124 |
| 7,348,501 | B1 * | 3/2008 | Nugent, Jr. | G01G 21/23 177/126 |
| 8,853,568 | B2 * | 10/2014 | Shinozaki | G01G 21/28 177/210 FP |

* cited by examiner

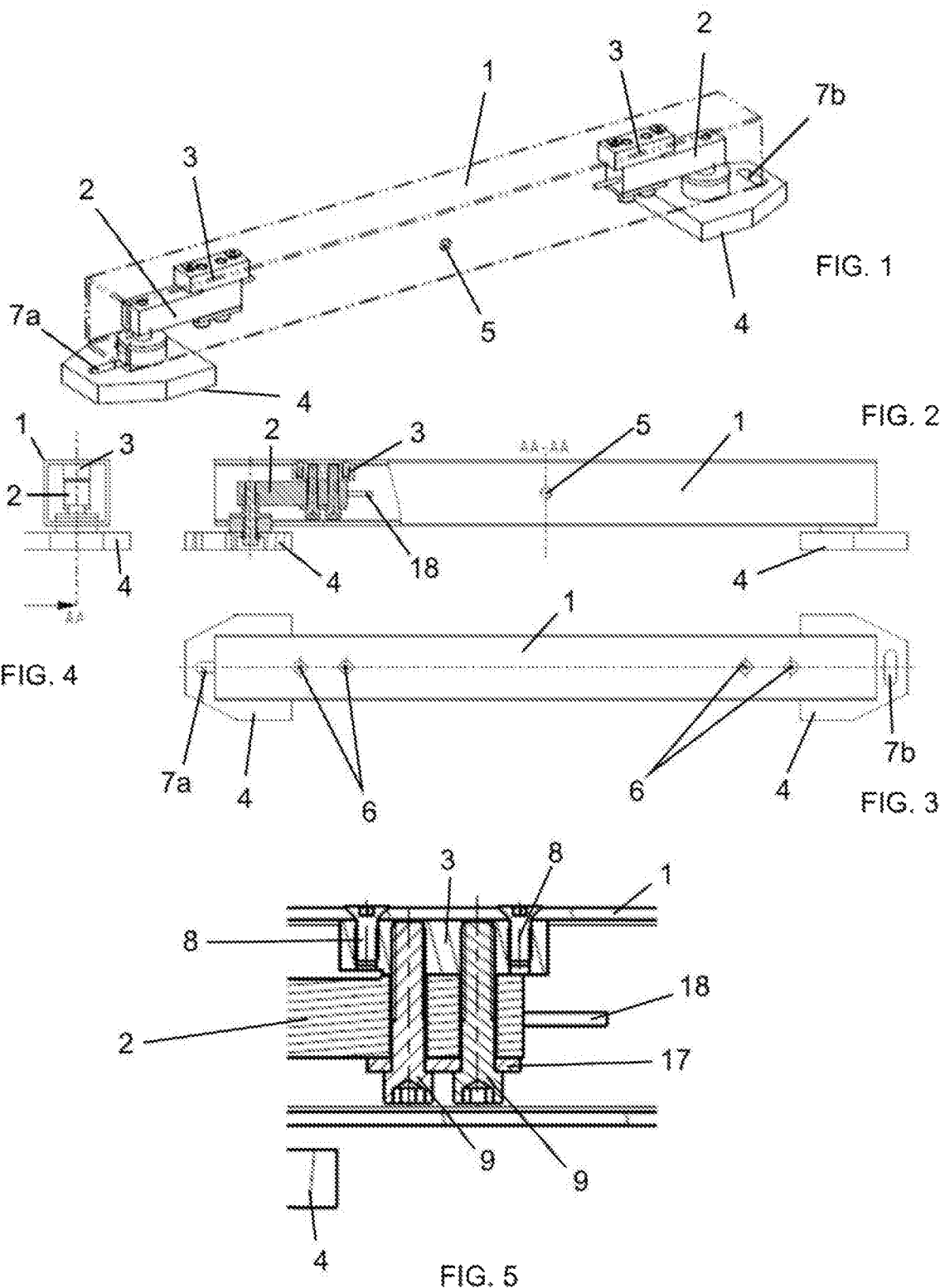

WEIGHING BAR ASSEMBLY

BACKGROUND OF THE INVENTION

The present invention relates to a weighing bar assembly composed of a hollow structural part, wherein two load cells are positioned therein, further including two ground support shoes.

Weighing bars are employed to accommodate load cells and are usually positioned under weighing platforms. The weighing bars must therefore be robust to withstand, without any structural change, the whole weight of the object to be weighed, in addition to the weight of the weighing platform. They must also safely accommodate the load cells allowing unimpeded displacement, making it possible to measure the weight.

Depending on the different places where the weighing bars can be applied, for example, open skies in the field, in exposure to bad weather such as water and mud, there is the need for an assembly of easy maintenance and with an improved seal in relation to the environment.

SUMMARY OF THE INVENTION

In order to solve the problems of the prior art, there is disclosed a weighing bar assembly where the bar itself is manufactured from a single hollow metallic structural part, where the load cells are housed therein. The attachment of the load cells to the sealing bar is done exclusively by means of screws, thus facilitating their replacement in case of maintenance. The assembly of the present invention presents closing side covers of the ends of the hollow structural part of the weighing bar, these covers being positioned after installation of the load cells in the assembly at the factory and can be removed in case of maintenance.

Unlike the prior art, the openings for allowing the displacement of the load cells are located in the bottom part of the hollow metallic structural part. These openings are sealed against the environment. This combination of characteristics allows for efficient sealing of the assembly of the present invention in relation to the environment and consequent improved protection against the weather and dust, allowing its use in more precarious conditions without requiring maintenance or early replacement.

Another advantage of the assembly of the present invention lies in the fact that no welding is used for the attachment of the load cells to the inside part of the structural part or for the attachment of the load cells to the ground support shoes. The absence of welds decreases the cost of production and facilitates maintenance at distant places which, in the case of the present invention, is done exclusively with the use of hand tools.

The characteristics of the present invention are as follows:

A weighing bar assembly comprising a hollow structural part, wherein two load cells are positioned therein, further including two ground support shoes. Each of the load cells is attached to one end to the structural part by means of a securing block and is attached in its other end to the corresponding support shoe.

Each of the two load cells is attached to the respective securing block by means of screws and where the securing blocks are in turn joined to the structural part by means of screws.

Each of the support shoes is attached to the respective load cell by means of a screw, which passes through a core with a tubular part, a tubular pad and a tubular spacer. The core and the spacer are loosely positioned around the bolt. Around the tubular spacer and below a ring-shaped part of the core is positioned the tubular pad, the pad being made of a material having elastomeric properties.

The structural part is a metal tube with rectangular or square cross-section having side covers, screw holes, bore for cables and openings for securing the support shoes to the load cells, wherein sealing rings are disposed around the openings.

BRIEF DESCRIPTION OF THE DRAWINGS

The present invention will be further described in more detail based on one example of realization represented in the drawings. The figures show:

FIG. 1—is a perspective view showing the weighing bar assembly of the present invention;

FIG. 2—is a side view of the weighing bar assembly of the present invention;

FIG. 3—is a top view of the weighing bar assembly of the present invention;

FIG. 4—is a side view of the weighing bar assembly of the present invention;

FIG. 5—is a detailed view of the attachment of a load cell to the structural part of the assembly of the present invention;

DETAILED DESCRIPTION

Figure 6:
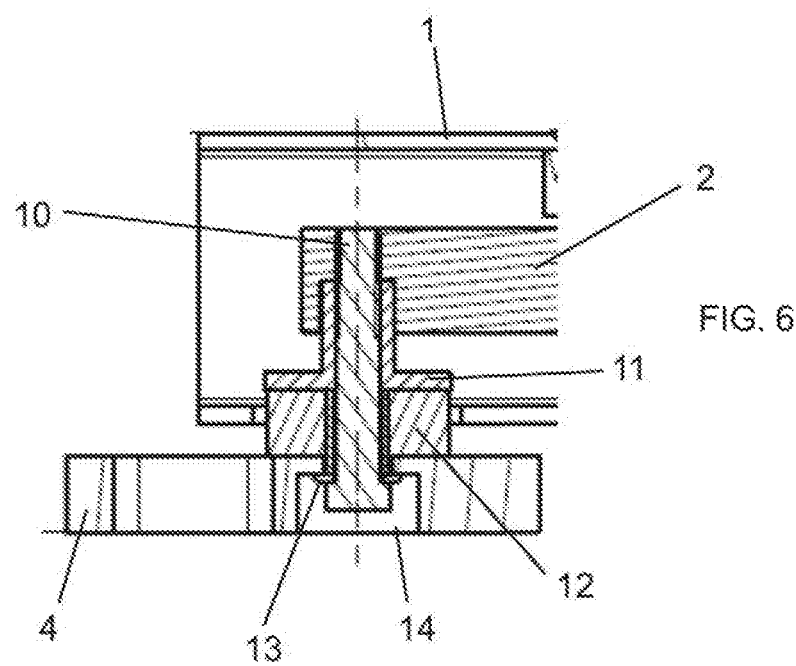
FIG. 6—is a detailed view of the attachment of a load cell to the support shoe of the assembly of the present invention.

As can be seen from FIG. 1, the assembly of the present invention comprises a structural part 1, shown in dotted lines for ease of understanding, which is hollow and has a preferably rectangular or square cross-section with round corners, that is, no sharp corners. This structural part 1 may be made of carbon steel or alloy steel from a rectangular tube with or without a longitudinal seam. Most important is that the cross section thereof allows for proper positioning on the inside, and corresponding attachment, of load cells 2. Usually, two load cells 2 are disposed, one at each end of the weighing bar assembly. Each load cell 2 is fixed on one side to the structural part 1 by means of a securing block 3 and, on the other end, to the support shoe 4, and it is thus free to receive the load applied thereto.

The support shoes 4 have oblong holes 7a, 7b for their removable attachment to the ground. In the present invention, the support shoes 4 are rotatably movable, allowing for easy positioning on the securing members, for example, anchor bolts.

Load cells 2 have cables 18 through which electrical signals are sent to an electronic processing module and consequent determination of the weighing. These cables 18 of both load cell 2 are gathered and exit the inside part of structural part 1 through hole 5. In one embodiment of the invention, that hole 5 is positioned in the sidewall of the structural part 1, it being possible to naturally place this hole 5 at another point suitable for the signal output.

In the side view of FIG. 2, a load cell 2 attached to one end to the securing block 3 can be seen in detail via a cross section, the other end of the load cell 2 being connected to the support shoe 4. Cables 18 carrying the signals from load cells 2 are joined together and leave the structural part 1 through hole 5.

In the top view of FIG. 3, it can be seen that the securing blocks 3 of the load cells 2 are detachably attached to the structural part 1 by means of screws inserted into the holes 6. It is clear that the manufacturing cost of the structural part 1 is greatly reduced, since it is a commercial part, for example a seamless rectangular profiled tube, which needs only to be cut to the appropriate length and processed with the introduction of four holes 6 for both securing blocks 3, a bore 5 for the output of the cables 18 and two openings 19 for fixing the load cells 2 to the support shoes 4.

In FIG. 4, showing a side view, the positioning of a load cell 2 attached to a securing block 3 inside the structural part 1 can be observed. The load cells 2 and the securing blocks 3 are introduced through the lateral openings of the structural part 1 when mounting the assembly. After positioning under holes 6 and corresponding fixation by means of screws, positioning and fixing of the support shoe 4 to each of the load cells 2 is carried out.

FIG. 5 shows a cross-sectional detail of the end of a load cell 2 attached to structural part 1. As can be seen from FIG. 5, a securing block 3, already previously attached by means of two screws 9 and a clamping plate 17 to a load cell 2, is introduced laterally into the structural part 1 and positioned below holes 6. Into holes 6, bolts 8 are releasably attached to the securing block 3 and the load cell 2 to the structural part 1. It is understood that the same assembling sequence is used for the other securing block 3 and load cell 2. The bolts 8 are preferably of the flat-head type so as to avoid any protrusions on the outside of structural part 1.

The connection of a load cell 2 with the support shoe 4 is shown in FIG. 6. As can be seen, the load cell 2, after assembling an end thereof inside the structural part 1 by means of the securing block 3, receives at its other end the support shoe 4. This assembly is carried out by means of a screw 10 which is introduced through the lower part of the support shoe 4 and then passes through an opening 19 in the lower part of the structural part 1. The purpose of the screw 10 is to secure the support shoe 4 vertically relative to the load cell 2, yet allowing the free rotation of the support shoe 4 in a plane perpendicular to the longitudinal axis of the screw 10. Thus, the support shoe 4 with its oblong holes 7a and 7b can be more easily positioned in ground anchoring elements. In order to realize such a technical solution, the screw 10 upon being screwed into a hole at the end of the load cell 2 presses a tubular spacer 13 against a core 11 of metal material, the latter in turn inserts itself with its tubular part into a recess around the hole for the screw 10 at the end of the load cell 2. Around the tubular spacer 13, there is a pad 12 also tubular made of a material with elastomeric properties, for example a thermoplastic elastomer such as TPU. Core 11 has below its tubular portion a ring-shaped portion which rests upon and covers the pad 12. The spacer 13 and the core 11, having a tubular shape and loosely engaging the screw 10, allow for, in turn, the bearing shoe 4 to be rotated freely with respect to the screw 10. The head of the screw 10, on the other hand, is inserted into a recess 14 of the lower part of the support shoe 4. The assembling of parts 11, 12 and 13 may, in an alternate embodiment, be provided already preassembled as shown in FIG. 7.

Figure 7:
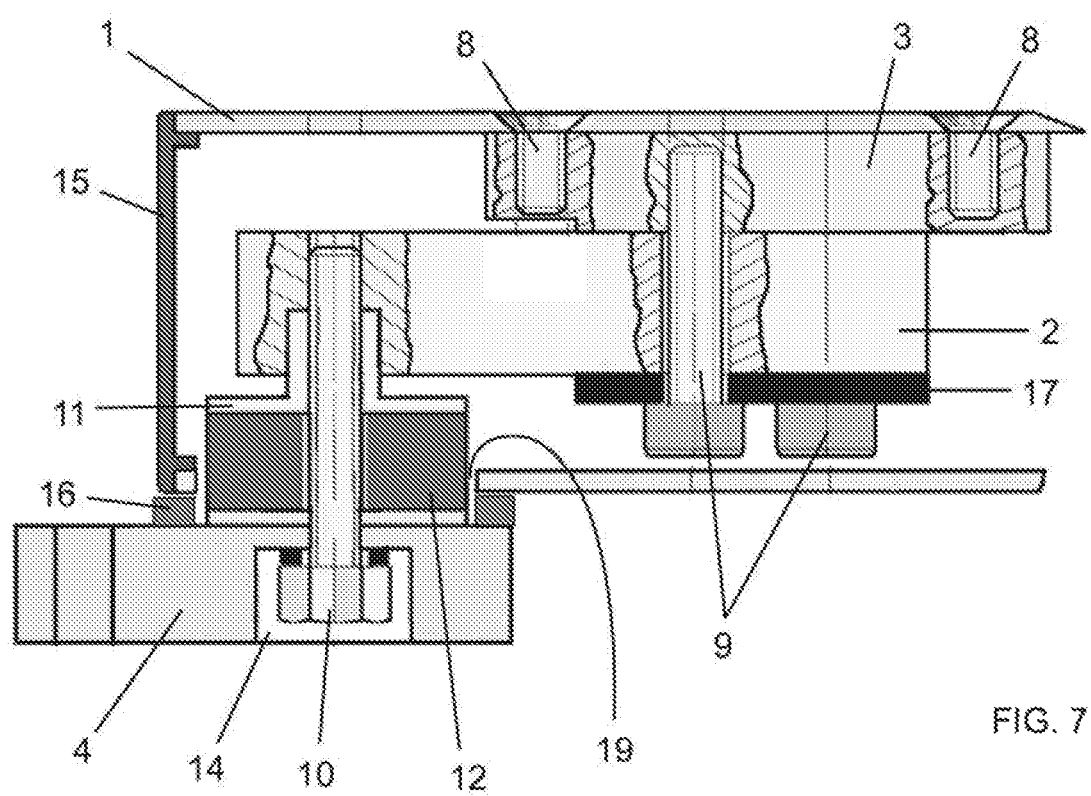
FIG. 7—is a detailed view of the attachment of one end of the assembly of the present invention fully assembled.

In FIG. 7, one can also see a sealing ring 16 made, for example, of foam or any other flexible sealing material, which can alternatively be inserted around the openings 19 of the structural part 1, being attached to the structural part 1 or to the support shoe 4. This sealing ring 16 allows increasing the tightness of the interior of the structural part 1 without, however, impairing the freedom of movement of the load cell 2. Finally, to finish mounting of the assembly of the present invention, side covers 15 are inserted, for example, by pressure or any other form of positive attachment into the side openings of the structural part 1. The side covers 15 can be easily removed to allow access to the load cells 2 and their corresponding maintenance.

After one example of a preferred embodiment has been described, it should be understood that the scope of the present invention encompasses other possible embodiments and is limited only by the content of the appended claims, which include their possible equivalents.

The invention claimed is:

1. A weighing bar assembly including a hollow structural part (1), wherein two load cells (2) are positioned inside the hollow structural part (1), further including two ground support shoes (4), wherein each of the load cells (2) is attached at one end to the structural part (1) by means of a securing block (3) and is attached at its other end to a corresponding ground support shoe (4), characterized in that the structural part (1) is made of a metal tube having a rectangular or square cross-section and has removable side covers (15), additionally the securing blocks (3) are joined to the structural part (1) by screws (8).

2. A weighing bar assembly according to claim 1, characterized in that each of the two load cells (2) is attached to the respective securing block (3) by screws.

3. A weighing bar assembly according to claim 1, characterized in that each of the support shoes (4) is attached to the respective load cell (2) by a screw (10), which passes through a core (11) having a tubular part, a tubular pad (12) and a tubular spacer (13).

4. A weighing bar assembly according to claim 1, characterized in that each of a core (11) and a tubular spacer (13) are positioned loosely around the screw (10).

5. A weighing bar assembly according to claim 3, characterized in that the tubular pad (12) is positioned around the tubular spacer (13) and below a ring-shaped portion of the core (11).

6. A weighing bar assembly according to claim 3, characterized in that the pad (12) is made of a material having elastomeric properties.

7. A weighing bar assembly according to claim 1, characterized in that the structural part (1) has holes (6) for bolts (8), a bore (5) for cables (18) and openings (19) for securing the support shoes (4) to the load cells (2).

8. A weighing bar assembly according to claim 7, characterized in that sealing rings (16) are disposed around the openings (19).

* * * * *